United States Patent [19]

Tamura et al.

[11] 4,126,770

[45] Nov. 21, 1978

[54] ECHO CANCELLER

[75] Inventors: Akira Sato, Tokyo; Junzo Tamura, Omiya; Seishi Kitayama, Tokyo, all of Japan

[73] Assignees: Kokusai Denshin Denwa Kabushiki Kaisha, Japan

[21] Appl. No.: 880,478

[22] Filed: Feb. 23, 1978

Related U.S. Application Data

[63] Continuation-in-part of Ser. No. 738,876, Nov. 4, 1976, abandoned.

[30] Foreign Application Priority Data

Nov. 7, 1975 [JP] Japan ................................ 50-133746

[51] Int. Cl.² ................................................ H04B 3/20

[52] U.S. Cl. ................................ 179/170.2; 179/170.8

[58] Field of Search ................ 179/170.2, 170.6, 170.8

[56] References Cited

U.S. PATENT DOCUMENTS

| | | | |
|---|---|---|---|
| 3,588,385 | 6/1971 | Moye | 179/170.2 |
| 3,732,410 | 5/1973 | Mackechnie | 179/170.2 |
| 3,903,377 | 9/1975 | Sato | 179/170.2 |
| 4,007,341 | 2/1977 | Sourgens et al. | 179/170.2 |

*Primary Examiner*—Kathleen H. Claffy
*Assistant Examiner*—Randall P. Myers
*Attorney, Agent, or Firm*—Robert E. Burns; Emmanuel J. Lobato; Bruce L. Adams

[57] ABSTRACT

An echo canceller in a telephone circuit for minimizing a residual echo obtained by subtracting a pseudo-echo reproduced from an impulse response of an echo path from a true echo, in which the inpulse response is corrected by the use of the product of the residual echo and received input. A variable coefficient circuit is provided between a multiplier for obtaining the product and a circuit for correcting the impulse response. A control circuit is provided for reducing the coefficient of the variable coefficient circuit in accordance with the lapse of time of the duration of the received input exceeding a predetermined threshold level after receiving a circuit connection completion signal of the telephone circuit.

2 Claims, 3 Drawing Figures

100 y 1 SUBTRACTOR e = y - ŷ 200
ŷ 4 CONVOLUTION INTEGRATOR
6 VARIABLE COEFFICIENT CIRCUIT
5 MULTIPLIER
2 RECEIVED SIGNAL REGISTER
3 IMPULSE RESPONSE REGISTER
8 TIMER
7 SIGNAL DETECTOR
400 x 300
9 CIRCUIT CONNECTION COMPLETION SIGNAL DETECTOR
500

ECHO CANCELLER

CROSS-REFERENCE TO RELATED APPLICATION

This application is a continuation-in-part of our copending application, Ser. No. 738,876, filed on Nov. 4, 1976 and now abandoned.

FIELD OF THE INVENTION

This invention relates to an echo canceller for effectively preventing an echo disturbance in a long-delay telephone circuit.

BACKGROUND OF THE INVENTION

At the start of a telephone call in a long-delay telephone circuit using an echo canceller, since the connection of a telephone circuit has just been completed, the impulse response must be rapidly subjected to a large amount of correction from its initial value. If this correction is delayed, a large residual echo will occur at the start of the telephone call. On the other hand, after the impulse response has been formed to some extent, that is, after an appreciable period of time has elapsed from the start of the telephone call, it is desired that the correction of the impulse response is an operation slow enough to follow-up a circuit condition change and still provide an accurate follow-up response.

However, the conventional echo canceller cannot satisfy in principle the above contradictory requirements.

BRIEF SUMMARY OF THE INVENTION

An object of this invention is to provide an echo canceller, which eliminates a residual echo at the start of a telephone call and reduces influence from overlapping talkings.

To attain the above object of this invention, an echo canceller is adapted such that, to minimize a residual echo obtained by subtracting a pseudo-echo reproduced from an impulse response of an echo path from a true echo, the impulse response is corrected by using the product of the residual echo and a received input, characterized in that a variable coefficient circuit is provided between a circuit for obtaining the product and a circuit for correcting the impulse response, and that control means is provided for reducing the coefficient of the variable coefficient circuit in accordance with the lapse of time of the duration of the received input level exceeding a predetermined threshold level after receiving a circuit connection completion signal.

BRIEF DESCRIPTION OF THE ACCOMPANYING DRAWING

The principle, construction and operation of this invention will be clearly understood from the following detailed decription taken in conjunction with the accompanying drawing, in which.

DETAILED DESCRIPTION

Figure 1:
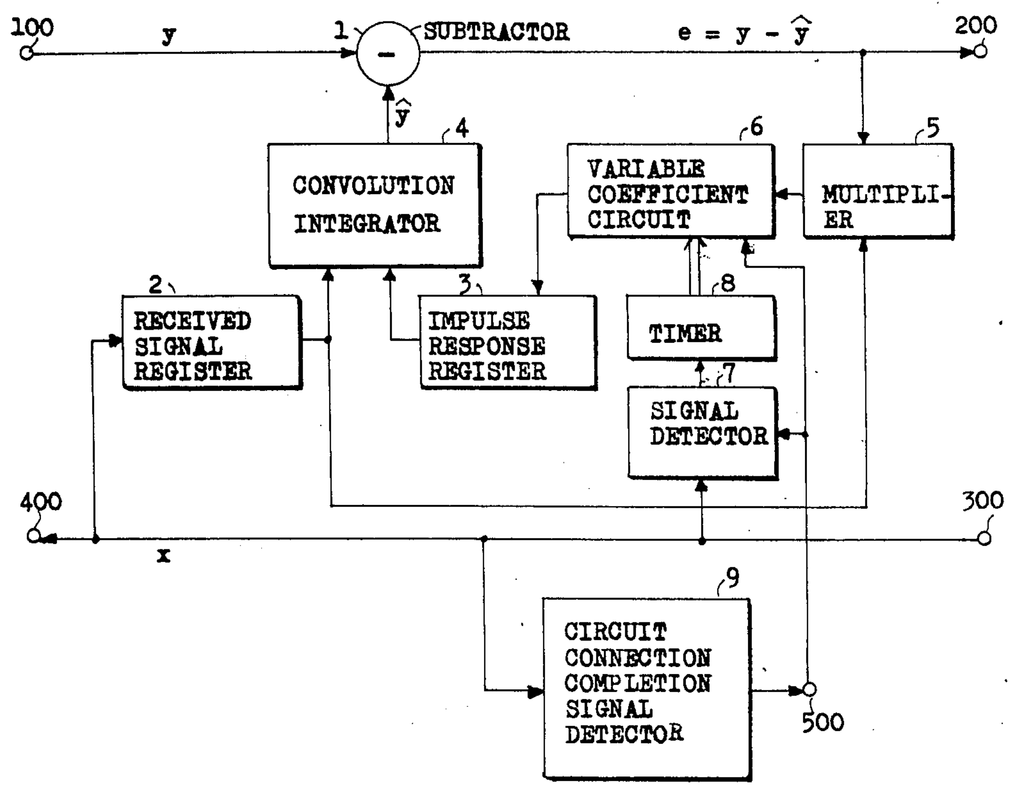
FIG. 1 is a block diagram illustrating an embodiment of this invention.

With reference to FIG. 1, reference numeral 100 indicates a transmitting input terminal; 200 designates a transmitting output terminal; 300 identifies a receiving input terminal; 400 denotes a receiving output terminal; 500 represents a circuit connection completion signal terminal; 1 shows a subtractor; 2 refers to a received signal register; 3 indicates an impulse response register; 4 designates a convolution integrator; 5 identifies a multiplier; 6 denotes a variable coefficient circuit such as a variable attenuator; 7 represents a signal detector, such as a conventional speech detector, for detecting a received signal exceeding a predetermined threshold level under control of the detected output of a signal detector 9 mentioned below; 8 shows a timer for counting clock pulses, such as a counter; 9 refers to a circuit connection completion signal detector, such as a ground dc signal detector. A line from the terminal 100 to the terminal 200 forms a transmission path, while a line from the terminal 300 to a terminal 400 forms a reception path.

To make a feature of this invention clear, a conventional echo canceller which is obtained by eliminating circuits 6, 7, 8 and 9 from FIG. 1 and directly connecting the output of the multiplier 5 to the impulse response register 3, will first be described.

In such a conventional circuit construction, the received signal $x$ arrives at a receiving input terminal 300 and is delivered out from a receiving output terminal 400 into a two-wire section including a telephone set. An echo ($y$) reflected in the two-wire section reaches a transmitting input terminal 100. Then, in the subtractor 1, a pseudo-echo ($\hat{y}$) alone is subtracted from the echo ($y$) and the residual echo ($e$) is applied to a receiving side through a transmitting output terminal 200. If the pseudo-echo ($\hat{y}$) is the same as the true echo ($y$), the residual echo ($e$) is zero and this implies that a complete echo cancellation has been achieved. On the other hand, the received signal $x$ is applied to the received signal register 2 and is subjected to convolution integration in the convolution integrator 4 by an impulse response of the impulse response register 3. Accordingly, if the content of the impulse response register 3 is an accurate impulse response, the output from the convolution integrator 4 becomes the pseudo-echo ($\hat{y}$) equal to the echo ($y$). In this case, the content of the impulse response register 3 starts from its initial value, for instance, the state in which all registers are in their reset states, and converges in such a direction that an adaptive control loop comprising the subtractor 1, the multiplier 5, the impulse response register 3 for storing an impulse response produced by the addition of the output from the multiplier 5, and the convolution integrator 4 operates to reduce the residual echo ($e$) to zero. During such a recurring operation, a correct impulse response is gradually produced in the impulse response register 3. In this case, in the multiplier 5, a multiplication of the following equation (1) is achieved using the content $x$ of the received signal register 2 and the residual echo $e$, by which is calculated an amount of correction $\Delta hj$ of the impulse response, which is added to the content of the impulse response register 3.

$$\Delta h_i = \frac{e_j \cdot x_{j-i}}{\sum_{i=0}^{N-1} (x_{j-i})^2} \quad (1)$$

Since the conventional system has such a construction and is designed to perform such an operation as described above, the algorithm of the adaptive control loop shown in the equation (1) is applied at the start of and during a telephone call.

Now, the features of the present invention will be clarified by a description limited only to the operation different from the conventional circuit. A first feature resides in the provision of the variable coefficient circuit 6 between the multiplier 5 and the impulse response register 3. A second feature lies in the provision of the signal detector 7 which is started by a circuit connection completion signal at the terminal 500 to detect a received signal exceeding a predetermined threshold level, and the timer 8 such as a counter for measuring the duration of the detected output.

The first feature is equal to changing the equation (1) to the following equation (2):

$$\Delta h_j = \alpha \cdot \frac{e_j \cdot x_{j-i}}{\sum_{i=0}^{N-1} (x_{j-i})^2} \quad (2)$$

$\alpha$: a variable coefficient

Namely, at the start of a telephone call, the variable coefficient is set so that $\alpha \geqq 1$.

Next, after a certain period of time has elapsed from the moment of the start of the telephone call, for example, after the sum total of the period of time for which the received power exceeded a predetermined threshold level (for instance, −31 dBnO) has reached about 500 ms, the variable coefficient is set so that $\alpha < 1$, and this is held till the end of the telephone call. In this case, for convenience of explanation, the above values of the variable coefficient will hereinafter be called as follows:

$\alpha \geqq 1$: the state A $\alpha < 1$: the state B

For judging whether it is at the start of a telephone call or after a certain period of time has elapsed, a telephone circuit connection completion signal can be used. This signal is a ground dc signal produced at the time of completion of the connection of the telephone circuit in the No. 5 signal system recommended by CCITT (International Telegraph and Telephone Consultative Committee). Accordingly, the use of this signal enables the time of the start of a telephone call to be detected. Further, after the start of the telephone call, an impulse resonse is gradually formed, but since its manner of formation is substantially proportional to the length of a received input signal, the signal detector 7 is provided for detecting a received signal exceeding a certain threshold level and, after the start of the telephone call, the length of the received input signal exceeding the threshold level is measured by the timer 8 such as a counter or the like, and if the measured value has exceeded a certain value, for instance, 500 milli-seconds, the state A is altered to the state B.

Figure 2:
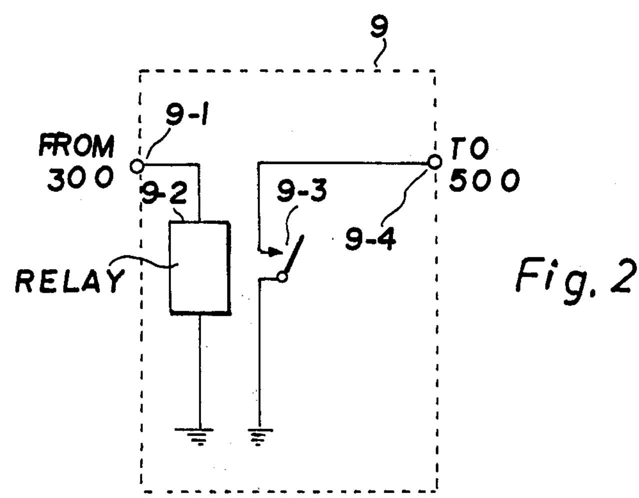
FIG. 2 is a circuit diagram illustrating an example of a circuit connection completion signal detector employed in the embodiment shown in FIG. 1.

An example of the circuit connection completion detector 9 is shown in FIG. 2, in which the ground signal applied from the terminal 300 to a terminal 9-1 is detected by the restoration of a relay 9-2 actuated by a direct current supplied through the terminal 300, so that a ground signal is applied to the terminal 500 through a relay contact 9-3 of the relay 9-2 and a terminal 9-4.

Figure 3:
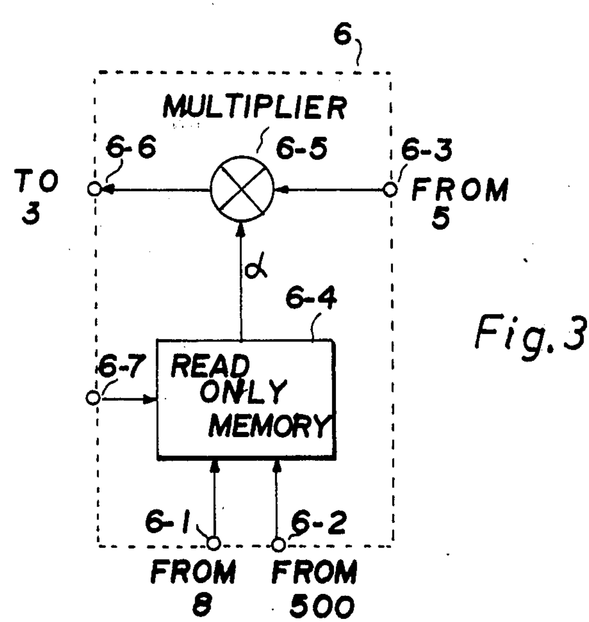
FIG. 3 is a block diagram illustrating an example of a variable coefficient circuit employed in the embodiment shown in FIG. 1.

An example of the variable coefficient circuit 6 is shown in FIG. 3, in which the output of the multiplier 5 is applied, through a terminal 6-3, a multiplier 6-5 and a terminal 6-6, to the impulse response register 3. The variable coefficient $\alpha$ applied to the multiplier 6-5 is read out of the outputs of the read-only memory 6-4 under control of the outputs of the timer 8 and the circuit connection completion signal detector 9. For example, the read-only memory 6-4 stores two states $\alpha_1$ and $\alpha_2$ of the variable coefficient $\alpha$, where the states $\alpha_1$ and $\alpha_2$ have a value greater than one and a value less than one, respectively. In the time interval of the above 500 milli-seconds indicated by the state of the output of the timer 8 at a terminal 6-1, the read-only memory 6-4 generates the variable coefficient $\alpha$ of the state $\alpha_1 (\geqq 1)$. Accordingly, the output of the multiplier 5 is applied to the impulse response register 3 after multiplied by the variable coefficient $\alpha$ of the state $\alpha_1$. After the above 500 milli-seconds indicated by the state of the output of the timer 8 at the terminal 6-1, the read-only memory 6-4 generates the variable coefficient $\alpha$ of the state $\alpha_2$ ($< 1$). In this time, the output of the multiplier 5 is applied to the impulse response register 3 after being multiplied by the variable coefficient $\alpha$ of the state $\alpha_2$. The state $\alpha_2$ of the variable coefficient $\alpha$ from the read-only memory 6-4 is restored to the state $\alpha_1$ in response to the output of the timer 8 which is generated after a predetermined time from the termination of the call detected by the signal detector 7 and applied from a terminal 6-7. In this manner, the states A and B are automatically shifted from one to the other, thereby to provide an optimum control in each case.

The number of states of the variable coefficient $\alpha$ can be further increased, so that the states of the variable coefficient $\alpha$ can be successively varied by the output of the timer 8 in course of time.

As has been described in the foregoing, the present invention employs a variable coefficient circuit and is adapted to change its coefficient in accordance with the states at the start of and during a telephone call, so that a rapid impulse response at the start of the telephone call can be set to thereby reduce a residual echo as much as possible, and during the telephone call, a slow and precise impulse response can be set. Accordingly, the circuit of this invention is little affected by external disturbance and is capable of sufficiently reducing a residual echo.

What we claim is:

1. An echo canceller for cancelling an echo of an echo path from a reception path to a transmission path, in a telephone circuit, comprising:

a subtractor inserted in the transmission path of said telephone circuit for subtracting a pseudo-echo from a true echo of said transmission path;

a received signal register connected to the reception path of said telephone circuit for temporarily storing a received input of said reception path;

a multiplier connected to said received signal register and said subtractor for producing a product of the residual echo and said received input;

a variable coefficient circuit connected to the output of said multiplier;

circuit connection completion detecting means for detecting a circuit connection completion signal of the telephone circuit and for controlling said variable coefficient circuit;

control means connected to the reception path, said circuit connection completion detecting means and said variable coefficient circuit for reducing the coefficient of the variable coefficient circuit in accordance with the lapse of time of the duration of the received input exceeding a predetermined threshold level after receiving said circuit connection completion signal of the telephone circuit;

an impulse response register connected to the output of said variable coefficient circuit for producing an impulse response of said echo path from said reception path to said transmission path; and a convolution integrator connected to said received signal register, said impulse response register and said subtractor for providing said pseudo-echo by the use of said received input and said impulse response.

2. An echo canceller according to claim 1, in which said control means comprises a signal detector connected to said reception path and said circuit connection completion detecting means for detecting a received input exceeding a threshold level after said circuit connection completion signal, and a timer connected to the output of said signal detector and said variable coefficient circuit for detecting the output of said signal detector exceeding a predetermined duration to develop a control pulse to control said variable coefficient circuit.

* * * * *